Oct. 1, 1968  H. WIENER  3,403,553
TENSIOMETER
Filed Feb. 25, 1965  4 Sheets-Sheet 1
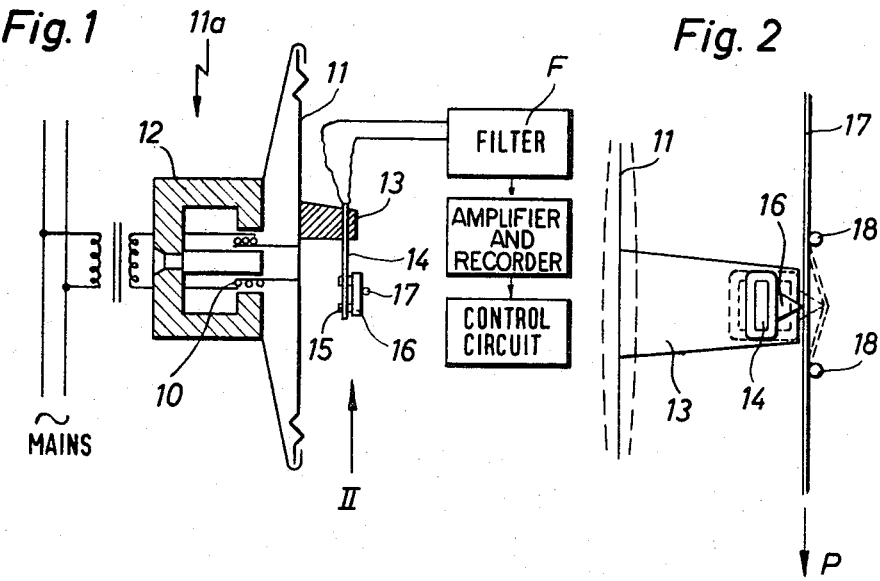
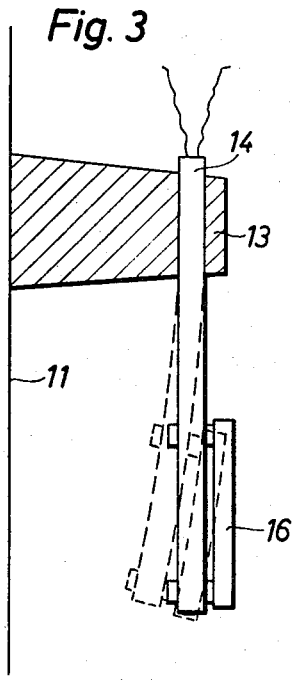
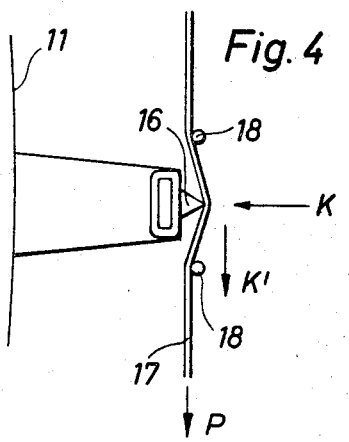
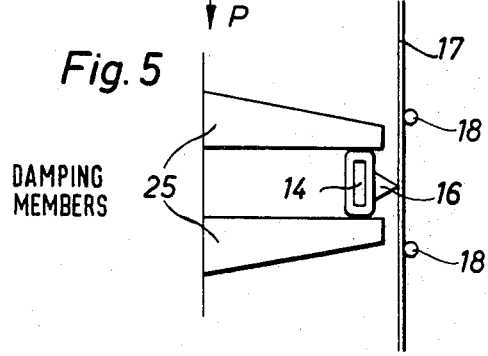
INVENTOR
Hans Wiener
BY Spencer & Kaye
ATTORNEYS Oct. 1, 1968  H. WIENER  3,403,553
TENSIOMETER Filed Feb. 25, 1965  4 Sheets-Sheet 3

INVENTOR
Hans Wiener

BY Spencer & Kaye
ATTORNEYS

Oct. 1, 1968  H. WIENER  3,403,553
TENSIOMETER
Filed Feb. 25, 1965  4 Sheets-Sheet 4
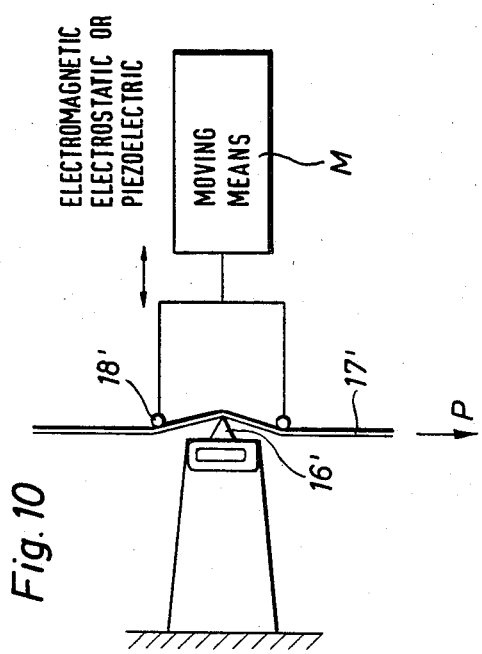
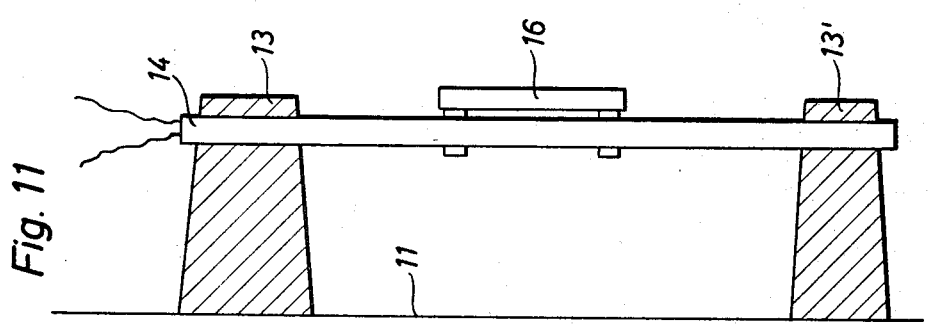
INVENTOR
Hans Wiener
BY *Spencer & Kaye*
ATTORNEYS

United States Patent Office 3,403,553
Patented Oct. 1, 1968

3,403,553
TENSIOMETER
Hans Wiener, Neuenhaus 106, Hilgen,
Rhineland, Germany
Filed Feb. 25, 1965, Ser. No. 435,293
Claims priority, application Germany, Feb. 25, 1964,
H 51,831
20 Claims. (Cl. 73—144)

ABSTRACT OF THE DISCLOSURE

The tension of a strand of yarn, tape, wire, or the like is continuously measured by periodically moving an electrical pressure transducer transversely against the strand to produce periodic transverse deflections thereof having a relatively constant peak amplitude. Due to the transverse deflection, the strand will momentarily press against the electrical pressure transducer and produce an electrical output signal whose amplitude is proportional to the tension of the strand. The tension of the strand can therefore be continuously measured by measuring the output voltage of the electrical pressure transducer. The electrical pressure transducer can be made of a piezo-electric quartz crystal, and the mechanical drive frequency of the transducer can be in the order of several thousand cycles per second, whereby the time delay between successive tension measurements will only amount to a fraction of a millisecond, and whereby the pressure transducer will not remain in contact with the strand long enough to produce any appreciable friction or to otherwise hinder movement of the strand.

---

The present invention relates to a process and to a device for the continuous measurement and monitoring of or for the achievement of an electrical signal indicative of the actual value in tension stresses in continuously moving or stationary tensioned yarns, tapes, wires or the like, and in particular yarn tensions in winding machines as used in the textile industry.

In the textile industry for example, considerable importance is attached to the regulation of the yarn tension in various types of processing steps. In particular, it is extremely important, when using synthetic yarns on winding machines, to achieve uniform yarn tension. In this connection, both stretching of the yarn due to excessive paying-off tension and also excessive tension oscillations during the winding step are very undesirable. The reason for this is that yarns which are not wound on with a uniform or strictly predetermined yarn tension will produce defective material during later processing, i.e., during warp-knitting and the like.

Various proposals have already been made and a wide range of devices has already been proposed for regulating, compensating for or keeping at a predetermined value the yarn tension during processing on machines. In this connection, two fundamentally different regulating principles are known and these may be applied either independently of each other or in combination with one another, depending on specific requirements.

One principle relates to a speed regulating arrangement applied to the take-up spindle, for example, in winding machines, for the purpose of keeping the yarn tension constant, by adaptation of the yarn pull during the processing step.

In the case of the other principle of yarn tension regulating devices, use is made of grid-type, disc, jaw or similar braking systems which impart the desired tension to the yarn on its path within the rewinding or processing step. The yarn itself is braked to a greater or lesser extent (and therewith tensioned) due to the action of variable friction, as it passes through the braking system.

The functions of both regulating systems are based on an arrangement whereby the parameters determining the yarn tension are automatically regulated or adjusted in dependence on the yarn tension. This automatically compensates for any actual yarn tension which differs from a predetermined normal yarn tension and which may momentarily appear due to the operation of the feed. Thus, sensing or scanning and therewith measurement or monitoring of the momentarily obtained yarn tension is the starting point of all regulating steps in the system. In this connection, the over-all functioning and above all the precision of the regulating arrangement for keeping the yarn tension constant depends substantially on how accurately and with what degree of inertia it is possible to effect a continuous monitoring or measurement of the yarn tension.

In order to transmit the value of the yarn tension to electrical members, as a rule the tension or spring force directly derived from the yarn tension is compared with an oppositely effective spring force. For this purpose, use is generally made of scanning or sensing fingers which are pre-tensioned by spring or magnetic forces and are effective against the yarn tension. Use is also made of movable yarn guiding eyelets or, alternatively, of deflecting pins or rollers in the various forms which transfer a movement which is dependent on the yarn pull, to the electrical members. In order to ensure a form of conversion of the mechanical adjustment values to electrical adjustment values which shall be as free as possible from friction, it has already been proposed to use bridge bolometers, photoelectrical capacitative or inductive devices, or low-friction adjustment resistances or potentiometers.

However, the known devices have a series of disadvantages. Although in these devices the transfer of the preceding mechanical adjustment to the variation of an electrical value is effected smoothly practically speaking, nevertheless, a greater or lesser mechanical adjustment of the previously-described yarn sensing device is a functional requirement of these devices.

The sensing members operating in most cases against the spring tension of a torsion spring have, naturally, a specific mass and therewith an intrinsic inertia. In view of the necessary deflections of the sensing members over the entire yarn tension range, sudden minimum adjustment values are unavoidable. This, however, involves, in an extremely disadvantageous manner, the problems of the inherent resonance of these sensing members and in many cases it is entirely necessary to provide supplementary mechanical or electromagnetic damping members which detrimentally influence the intrinsic inertia and response sensitivity of such systems. Even with subsequent use of the most modern electrical structural elements, which per se permit the utilization of a steep characteristic curve, it is not possible to go below a lower limit because of the mechanical minimum adjustment of the sensing member. The reason for this is that the amplification of the sequentially connected amplifier can not be brought, within the regulating device, up to a value of any desired high magnitude, since otherwise the expenditure is greatly increased and the stability of the circuit and also the reliability of the device are impaired.

A further disadvantage of the known devices is that these devices, due to the mechanical friction of the sensing members in the range of small and extremely small yarn tensions such as the type encountered in the processing of synthetic yarns, no longer operate or only operate inaccurately.

Apart from these difficulties which are due to the sensing mechanism of the known devices, there are further disadvantages within the subsequently connected electrical circuit. When variable capacitances or inductances are used, it is necessary to provide complicated carrier frequency or high frequency circuits, in order to achieve an electrical control value. When photoelectric members are used, it is generally extremely difficult to provide that the source of light be constant over relatively long periods of time. Finally, rheostats always possess the disadvantage of having an adjustment moment even though it is only small, and are naturally subjected to considerable wear when there is contniuous adjustment.

With this prior art in mind, it is the main object of the present invention to provide a low inertia or inertia free and highly responsive yarn, tape, or wire tension measuring and monitoring method and device which does not possess the above-mentioned disadvantages of known measuring arrangements.

Another object is to provide a yarn tension sensing arrangement in which the delay time between the change in yarn tension and the indication of this change is very short.

A further object of the invention is to provide an arrangement of the character described in which the amplifiers to be used therewith can be manufactured considerably less expensively and in such form that they are simpler, more reliable, and more stable than the elements which heretofore have been used in such arrangements.

These objects and others ancillary thereto are accomplished in accordance with preferred embodiments of the invention wherein an electrical transmitter system is subjected to the action of a pressure or tension load. Energy for providing continuous, dynamic and preferably sinusoidally alternating movement having a relatively constant peak amplitude is supplied within the measuring arrangement and the tension load is applied intermittently in accordance with the frequency of the movement. This provides an electrical magnitude as a continuous function of the yarn, tape, or wire tension. The resulting pulse-like electrical voltage is proportional to the momentary yarn tension and is used as a control voltage for measuring and monitoring appliances. Alternatively, this voltage may be used as an actual value magnitude in subsequent variable-gain amplifiers or control amplifiers for the adjustment or control of the tensile stress of the yarn.

As a result of this arrangement, greatly improved and precise, and above all practically inertia-free yarn or wire tension measurement becomes possible. Furthermore, it is no longer necessary to use a mechanical intermediate member, which has the disadvantages of frictional resistances, between the yarn tension sensing arrangements and the subsequent electrical measuring member.

Preferably, there is used for the sensing of the tensioned yarn or the like (and therewith as the electrical transmitter system) a piezo crystal or quartz system which, under the influence of the yarn tension transmitted thereto as a compression or tensile force by the yarn itself, produces a piezoelectric voltage. This electrical transmitter system, for example, the crystal system, is advantageously operated in a dynamic meausring arrangement. For this purpose, a preferably sinusoidally varying acceleration is imparted to the system itself by means of a suitable arrangement and in this way the electrical transmitter system is, in accordance with the momentarily present friction force of the yarn, subjected to a sinusoidal pressure which is also dependent on the alternating acceleration.

Additional objects and advantages of the present invention will become apparent upon consideration of the following description when taken in conjunction with the accompanying drawings in which:

FIGURE 1 is a schematic partial sectional view of one embodiment of the invention.

FIGURE 2 is a schematic elevational view of the embodiment of FIGURE 1 viewed in the direction of arrow II.

FIGURE 3 is a schematic enlarged partial sectional view showing a detail of FIGURE 1.

FIGURE 4 is a view similar to FIGURE 2 showing the system in a deflected position.

FIGURE 5 is a view similar to FIGURE 2 but showing another embodiment.

FIGURE 10 is a further embodiment of the invention according to the device of FIGURE 4 wherein the moving means include an electromagnetic or an electrostatic or a piezoelectric system.

FIGURE 11 illustrates a device wherein said moving means includes an A.C. driven system having a diaphragm, holding means for supporting the crystal at both ends and arranged so that the strand pull acts on the center of the crystal between the supported ends.

Figure 6:
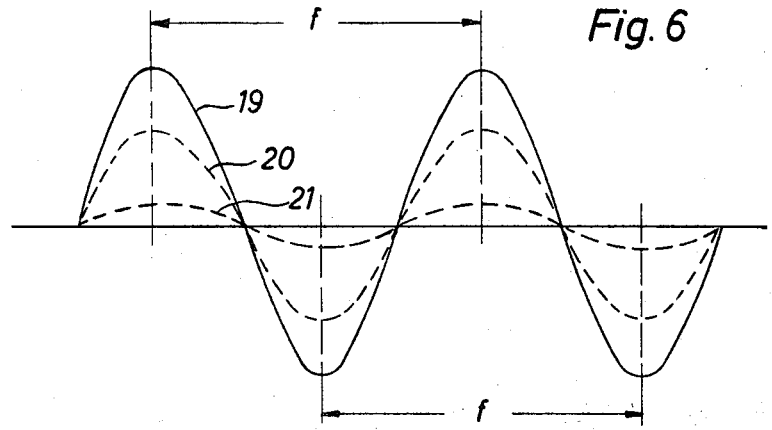
FIGURE 6 is an oscillogram of the impulse provided by the electrical transmitter system in one mode of the operation.

With more particular reference to the drawings, FIGURE 1 shows the present invention using a diaphragm system 11a having a solenoid 10 (or plunger coil), a diaphragm proper 11, and a magnet system 12.

For producing the preferably sinusoidally varying acceleration to be transmitted to the crystal a diaphragm system which includes, for example, a plunger coil or a similar electromagnetic or electrostatic system and driven by A.C. voltage may be used.

The selection of the most advantageous driving frequency depends substantially on the structure and magnitude and on the suspension of the crystal itself. With suitable arrangements, advantageous measuring results can be achieved even with ad riving frequency of 50 c./s. absolute and in this connection yarn tensions of only a few milligrams are indicated entirely accurately and reliably. If use is made of a driving voltage with a frequency of 50 or 60 c./s. the advantage is achieved that this voltage can be taken from the mains, so that it becomes unnecessary to separately generate the driving energy with a different frequency. With suitable arrangement and influence of the yarn pull on the driven crystal system, mechanical strokes of fractions of a millimeter, for example, strokes of less than one hundredth of a millimeter, are due to the very great sensitivity of the crystal system, completely adequate for permitting the ascertainment of unequivocal measuring values over the entire range of the yarn tensions which are possible with cross-winding machines in the textile industry.

The piezoelectric impulse voltage supplied by the electrical transmitter system, preferably by the crystal system, has a frequency which is derived from the operating frequency of the system, i.e., a predetermined number of impulses is obtained per second. The voltage level of the individual impulse represents a continuous function of the yarn pull. From this it will be seen that the measuring device according to the invention operates practically speaking without inertia, since a suddenly-occurring yarn tension increase is, in the most disadvantageous case, indicated with a maximum delay time of not quite a period (or cycle) of the driving frequency, if the increase in the yarn tension takes place between two impulses. If the operation is carried into effect with a driving frequency of several thousand cycles, then the maximum possible delay time between the increase in the yarn tension and the indication maounts to fractions of a millisecond. This constitutes a very great advance as compared with known devices.

Disposed on the diaphragm of the system is a retaining means 13, manufactured from a suitable material, for a piezo crystal plate 14. The crystal plate carries two damping rings 15 which carry a sensing member 16 proper made preferably from an extremely wear-resisting material, for example, ceramic. This member transmits to the crystal plate the yarn tension or yarn pull of the yarn 17 which travels past it.

FIGURE 2 shows the movement, produced by the electromagnetic drive, of the crystal system into the end or extreme positions shown in broken lines. The yarn 17 is caused to sag, by the oscillating crystal plate 14 and the sensing member 16 secured thereon, between the two yarn guiding pins 18 during the stroke. Sensing member 16 and the two yarn guide pins 18 form a yarn triangle device. In accordance with the tensile force P momentarily effective on the yarn 17, a greater or lesser pressure is exerted on the crystal body proper. In accordance with the unilateral suspension of the crystal body shown in this example, it is bent to a greater or lesser extent, and this is shown in FIGURE 3 in the form of a considerably enlarged detail from FIGURE 1.

In reality, the movements of the diaghram and of the crystal member and also the sag of the yarn between the two yarn guiding pins, but above all the bending of the crystal, are even microscopically small.

In place of this mode of suspension (shown here purely by way of example) of the crystal, the latter may also be secured on two ends in some other expedient manner, so that the crystal is then stressed by the yarn pull in the center, in the manner of a bridge, and is supported on both ends. Furthermore, the solenoid diaphram shown could also be replaced by another electromagnetic oscillating diaphragm or oscillating armature device. Depending on the adjustment of the crystal system relatively to the two yarn guiding pins 18 or relatively to the position of the yarn as a whole, the crystal system is either loaded by the yarn tension during the entire stroke to form one mode of operation or, in the event of a larger spacing between the system and the yarn, loading takes place only during a part of the total amplitude in each specific case and this is another mode of operation. With a variation in the adjustment of the members relatively to one another, the impulse form of the piezoelectric voltage generated by the crystal will also vary and the deciding factor is the circuit arrangement in its entirety in which the yarn tension measuring apparatus according to the invention is to be operated, so as to determine the most advantageous mode of operation and impulse form of the piezoelectric voltage for that purpose.

Figure 7:
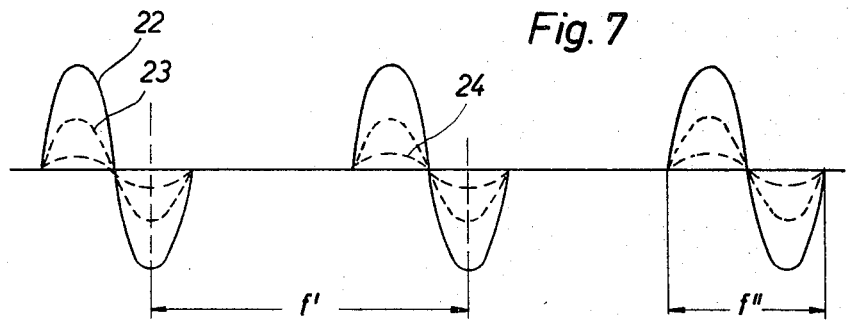
FIGURE 7 is an oscillogram of the impulse provided by the electrical transmitter system in another mode of operation.

FIGURES 6 and 7 show two oscillograms of the impulse voltages supplied by the crystal system with varying basic adjustments. FIGURE 6 shows the oscillogram of the A.C. voltage supplied by the crystal with loading of the crystal by the yarn during the entire stroke of the diaphragam. The amplitude spacing $f$ is, in this connection, equal to the driving frequency of the crystal system. The curve 19 shows the voltage development on the crystal under high yarn tension, whereas the curves 20 and 21 shown in broken lines represent the piezo voltage development with correspondingly lower yarn tensions.

FIGURE 7 shows the oscillogram of an impulse form supplied by the crystal with loading o fthe crystal by the yarn only during a half of the driving amplitude, i.e., the adjustment of the crystal system to the yarn guided along it is effected in such a manner that, when the diaphragm is in the inoperative, central position, the sensing member just contacts the yarn, so that, when the crystal swings back, it oscillates freely and unloaded. Contact with the yarn is established (and corresponding pressure loading takes place) only during transition of the oscillating movement into the positive half wave. The amplitude spacing $f'$ here is again equal to the frequency of the driving voltage, whereas the spacing $f''$ corresponds approximately to half the spacing $f'$, since a dynamic movement of the crystal takes place of course only during half the total driving period. The curve 22 shows the voltage development on the crystal with high yarn tension, whereas the curves 23 and 24 shown in broken lines represent the piezo voltage development with correspondingly lower yarn tensions.

FIGURE 4 shows the crystal system with the sensing member 16 and the yarn 17 in the position of full positive amplitude of the driving diaphragm. The yarn or the crystal is deformed in accordance with the yarn tension. The tensile force P acts on the yarn, since the yarn is drawn along the yarn guiding pins 18 in this direction in accordance with the position of the take up spindle. Apart from the component K of the force in a direction at a right angle to yarn movement also a smaller component K' acts on the crystal in the direction of the tensile force P and is effective on the crystal. Since the yarn is drawn past the crystal at a relatively high speed during the rewinding step, due to the component K' which, because of this, becomes uncontrollable, a noise potential (fluctuation voltage) is set up at the crystal output, so that the oscillogram, without the switching in of means for suppressing or eliminating this noise level, adopts approximately the form shown in FIGURE 8. The effective amplitude resulting from the yarn tension is subject to interference by noise due to the movement of the yarn along the sensing member. In order to suppress this noise derived from the yarn movement, the crystal according to FIGURE 5 is damped by two damping members 25 made of suitable material and disposed transversely of the useful movement direction, in such a manner that the component K' can not become effective as a bending moment on the crystal, so that the noise is suppressed. A further possibility for suppressing this noise can be provided by embedding the crystal in a damping mass.

It is also possible to manufacture the body and to grind it, at the stage of manufacturing and selecting the crystal body and while giving due regard to the physical laws applying to piezo crystals, in such a manner that during the deformation due to the components of the effective force K' as compared with the main component, it supplies practically speaking no noise voltage or in all events a noise voltage which no longer constitutes a source of disturbance.

Figure 8:
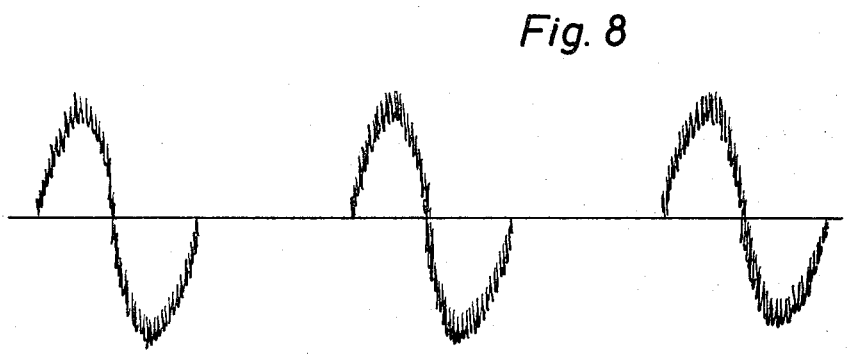
FIGURE 8 is an oscillogram similar to that of FIGURE 7 but with a noticeable noise level.

Furthermore, the invention provides a yet a further mode of eliminating this undesired noise voltage. The noise voltage produced by the yarn movement has, as the oscillogram according to FIGURE 8 shows, a substantially higher frequency than the effective amplitude. The noise voltage, as is apparent from the oscillogram, is a frequency mixture, the median noise frequency being a multiple of the frequency of the basic amplitude as long as the latter is in the audible or means frequency zone. Due to this clear differentiation between the two frequencies of the effective and noise levels, it becomes possible, by connecting an electrical filter F (see FIGURE 1), for example, a low-pass or band-pass filter tuned to the effective frequency, to completely filter out the undesirable extraneous noises. Whether such a filter is used at the input or at the output of the amplifier or within the latter depends on the nature and size of the subsequent control or amplifier circuit. After the connection of a filter of this kind, a clear oscillogram of the effective amplitude is obtained, as shown in FIGURES 6 and 7.

The measuring process and the measuring device according to the invention provide that a continuous impulse voltage is supplied by the measuring arrangement, the momentary voltage level of these impulses being directly proportional to the yarn pull. If the yarn tension is equal to zero or if, due to a break in the yarn or termination of the winding or processing step, no yarn is present opposite the sensing device, the system automatically ceases to supply piezo voltage, since no forces are able to act on the crystal system. For this reason, the measuring device according to the invention can also be used as a so-called yarn knock-off connection arrangement if there are provided within the subsequent amplifier arrangement electrical switching means which, when the yarn tears or impulse voltages are supplied, automatically actuate a signal or control means for switching off the machine.

The impulse voltages supplied by the measuring device according to the invention and which represent the electrical actual value of the momentarily present yarn tension can be used in various ways for electrical control and regulating purposes. If a yarn tension adjustment is to be carried into effect by the system of desired value and actual value comparison, it is possible for example for the desired value impulse tuned to the same frequency to be supplied by a desired value source (desired value transmitter). Then, in a sequentially connected electrical amplifier, the voltage levels of the predetermined desired value impulse and the actual impulse supplied by the cristal system are, in known manner, continuously compared with each other. If the actual value differs from the desired value, then the amplifier output supplies a correcting condition, which influences the yarn braking arrangement, until the difference between the actual value and the comparison value drops to zero or goes below a predetermined minimum value. With the aid of this mode of control, it becomes possible to centrally control as many machines as may be desired.

Figure 9:
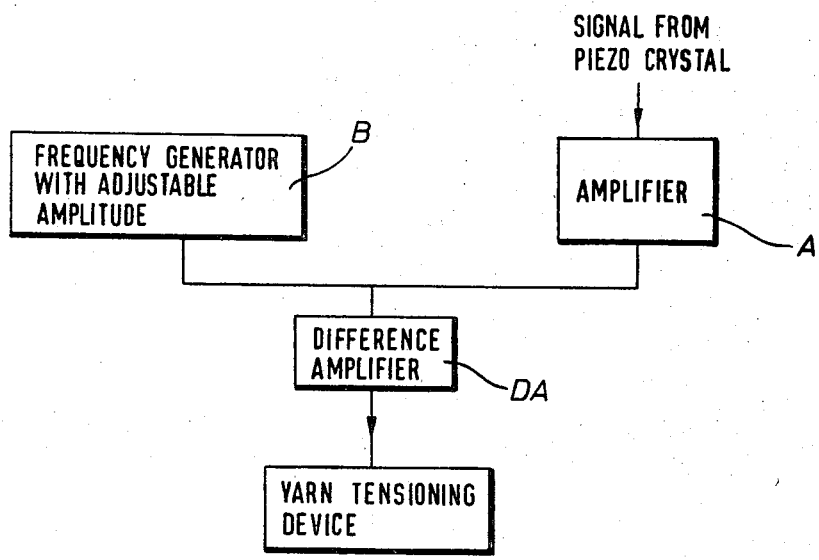
FIGURE 9 is a block diagram of one type of control which may be used with the present invention.

FIGURE 9 shows an amplifier A to which the varying voltage from the piezo crystal is fed and which is thus considered the actual value of the yarn tension. Means B is provided to generate a varying voltage of the same frequency as the piezo crystal is to produce. The amplitude of B is adjusted to the desired level and thus is considered the desired value of the yarn tension. The outputs of A and B are fed to difference amplifier DA which controls the yarn tensioning device in the correct sense.

Furthermore, it is possible to integrate the impulse voltage supplied with the aid of electrical switching means in order that a D.C. control voltage, for example, for transducer controls, which increases or decreases in proportion to the yarn tension, may be available for amplifier or control arrangements adapted thereto. Thus, if the impulse voltage supplied by the measuring system is fed to a suitable, indicating or recording measuring apparatus, the momentary yarn tension can be directly indicated and read off.

It is also possible to transmit the dynamic movement energy not to the crystal but, inversely, to the yarn guiding pins. In this case, the crystal is secured in a suitable retaining arrangement, whereas the yarn guiding pins are driven by a diaphragm system or by a purely mechanical driving system, preferably sinusoidally and in the direction of the crystal body. With this arrangement also, the same inpulse voltages are produced which were discussed individually in the description. It depends mainly on the arrangement in its entirety as to what embodiment is preferred.

It is possible also to use other driving systems (illustrated by way of example) for the dynamic movement procedures. Thus, for example, it is possible to use an electrically operated piezoelectric resonator or magnetostrictive oscillator as the driving member. With properly adapted crystal dimensions, the crystal system provided as the transmitter or source can be doubly exploited, by being inserted primarily as a source (transmitter) and also, in a separate electric circuit, secondarily as a mechanical oscillation source.

An essential advantage of the device according to the invention is that, in accordance with the alternating voltage now supplied by the system, it is possible in a simple manner to sequentially connect an A.C. voltage amplifier or also a resonance amplifier adapted to the driving frequency for example of the piezo crystal. These amplifiers can, in contradistinction to electrometer arrangements or D.C. voltage amplifiers, be manufactured considerably less expensively and in such form that they are simpler, more reliable and more stable.

As mentioned above the device having the essential features of the underlying idea of the invention can also be carried into effect if the piezoelectric transmitter system is replaced by another system, for example, an electro-magnetic transmitter system, a tensile or compression force derived from the momentarily present yarn tension would then intermittently act on this system.

With sensitive electromagnetic systems, for example plunger coil systems, adequately high output voltages are already obtained when extremely small mechanical lifting movements of the plunger coil or of the armature take place.

According to the invention, an electromagnetic transmitter system of this kind is, by means of a device which is also electromagnetic or mechanical, caused to carry out sinusoidal oscillations against the tensioned yarn or the like, so that, in correspondence with the momentary tensile stress of the yarn or the like and the counterforce varying therewith against the return force of this system, strokes of greater or less value take place at the plunger coil or the armature and, in this way, also an impulse voltage which is proportional to the yarn tension is produced.

The plunger coil (solenoid) or the armature of the electromagnetic transmitter system can be provided with a restoring force acting through the agency of diaphragms or similar means. The entire system, with the necessary yarn guiding members, is so designed that the yarn or the like acts directly on a solenoid or the armature of the sensing system, i.e., that a proportional component derived from the tensile force in the direction of movement of the yarn or the like becomes effective against the restoring force of the systems. Since the intermittent acceleration acts on the entire transmitter system, with every mechanical stroke of the system which is effective against the yarn pull an adjustment and movement of the solenoid or of the armature is effected which is dependent on the monetary yarn tension, so that the impulse voltages formed constitute a proportional electrical value of the momentary mechanical yarn tension.

The process and the device according to the present invention could also be used for the measuring of the tensile stressing of tapes, for example sound tapes or wires during the manufacture or further processing thereof, or also for measuring the tensile stress in similar other media.

It is to be understoood that the term "strand" is meant to include yarn, wire, film, and other types of continuous length articles which, in their processing, may require tension monitoring.

It will be understood that the above description of the present invention is susceptible to various modifications, changes, and adaptations, and the same are intended to be comprehended within the meaning and range of equivalents of the appended claims.

What is claimed is:

1. A device for continuously monitoring tensile stresses of continuous strands, comprising, in combination:
   strand guiding means;
   a strand tension sensing crystal system adjacent said guiding means for generating a voltage which signifies the force of engagement between the crystal system and a strand passing between the guiding means and the crystal system; and
   means for relatively moving the crystal system and the guiding means toward and away from each other in an oscillatory manner.

2. A device as defined in claim 1 wherein said moving means is electromagnetically actuated.

3. A device as defined in claim 1 wherein said moving means is electrostatically actuated.

4. A device as defined in claim 1 wherein said moving means is piezoelectrically actuated.

5. A device as defined in claim 1 wherein the guiding means are stationary and the means for moving oscillates the crystal system.

6. A device as defined in claim 1 wherein the crystal system is stationary and the means for moving oscillates the guiding means.

7. A device as defined in claim 1 wherein said moving means is driven by a diaphragm system.

8. A device as defined in claim 1 and further means for recording said voltage.

9. A device as defined in claim 1 and further comprising amplifier means tuned to the frequency of the oscillatory movement and connected to amplify said voltage.

10. A device as defined in claim 1 wherein said moving means includes a solenoid actuated diaphragm system.

11. A device as defined in claim 1 wherein said crystal system includes a sensing element and an electrical transmitter system.

12. A device as defined in claim 11 wherein said electrical transmitter system includes a piezoelectric crystal.

13. A device as defined in claim 11 wherein said guiding means includes two spaced pins and said sensing element is mounted between said pins and on the side of the strand opposite said pins.

14. A device as defined in claim 13 wherein said electrical transmitter system includes a piezoelectric crystal.

15. A device as defined in claim 14 wherein said moving means includes an alternatingly driven system having a diaphragm, a holder to which said piezoelectric crystal is clamped at one end, said holder being connected with the diaphragm and arranged so that the strand pressure acts on the other end of the crystal.

16. A device as defined in claim 14 wherein said moving means includes an alternatingly driven system having a diaphragm, holding means for supporting the piezoelectric crystal at both ends and arranged so that the strand pressure acts on the center of the piezoelectric crystal between the supported ends.

17. A device as defined in claim 14 and further comprising damping members for damping the piezoelectric crystal in the direction of the force component acting on it in the direction of strand movement.

18. A device as defined in claim 14 wherein said damping means comprises a damping mass in which the piezoelectric crystal is embedded.

19. A device as defined in claim 13 wherein the moving means includes a solenoid-diaphragm system for moving the pins toward and away from the sensing element.

20. A device for continuously monitoring tensile stresses of continuous strands, comprising, in combination:
strand guiding means;
a strand tension sensing crystal system adjacent said guiding means for generating a first voltage which signifies the force of engagement between the crystal system and a strand passing between the guiding means and the crystal system;
means for relatively moving the crystal system and the guiding means toward and away from each other in an oscillating manner;
means for generating a second voltage which signifies the desired value of strand tension; and
means for comparing said second voltage with said first voltage for forming a correction voltage which signifies the difference between the actual value of strand tension and the desired value of strand tension.

References Cited

UNITED STATES PATENTS

| | | | |
|---|---|---|---|
| 1,871,776 | 8/1932 | Chatillon | 73—144 |
| 2,573,168 | 10/1951 | Mason et al. | 73—71.5 X |
| 2,767,576 | 10/1956 | Seney | 73—144 |
| 2,834,203 | 5/1958 | Sampson | 73—81 |
| 2,844,028 | 7/1958 | Benn | 73—160 |
| 3,153,338 | 10/1964 | Kleesattel | 73—67.1 |
| 3,246,516 | 4/1966 | Maropis | 73—67.1 X |

RICHARD C. QUEISSER, *Primary Examiner.*

C. A. RUEHL, *Assistant Examiner.*